United States Patent [19] [11] Patent Number: 5,603,353
Clark et al. [45] Date of Patent: Feb. 18, 1997

[54] QUICK DISCONNECT COUPLING

[75] Inventors: Eddie J. Clark, Fort Worth; Russell Paxton, Azle, both of Tex.

[73] Assignee: Essman Screw Products, Inc., Bryan, Ohio

[21] Appl. No.: 560,103

[22] Filed: Nov. 17, 1995

[51] Int. Cl.$^6$ ..................... F16L 37/28
[52] U.S. Cl. ............. 137/614.01; 137/614.05; 137/614.03
[58] Field of Search ............ 137/614.03, 614.04, 137/614.05, 614.06, 614.01; 251/149.6, 149.9

[56] References Cited

U.S. PATENT DOCUMENTS

| Re. 34,781 | 11/1994 | Spalink et al. |
| 104,025 | 6/1870 | Harvey |
| 2,473,223 | 3/1947 | Scheiwer |
| 2,543,589 | 2/1951 | Newcomb |
| 2,696,993 | 12/1954 | Buckler |
| 2,739,612 | 3/1956 | Hansen |
| 2,850,298 | 9/1958 | Clark |
| 3,295,584 | 1/1967 | Proctor |
| 3,424,181 | 1/1969 | Morse |
| 3,731,705 | 5/1973 | Butler |
| 3,840,967 | 10/1974 | Olson |
| 3,874,411 | 4/1975 | Vik |
| 3,910,312 | 10/1975 | Weinhold |
| 3,916,641 | 11/1975 | Mullins |
| 3,935,713 | 2/1976 | Olson |
| 4,069,686 | 1/1978 | Hoelman |
| 4,078,578 | 3/1978 | Buchholz |
| 4,139,049 | 2/1979 | Baumann et al. |
| 4,181,150 | 1/1980 | Maldavs |
| 4,182,370 | 1/1980 | Karcher |
| 4,222,411 | 9/1980 | Herzan et al. |
| 4,287,914 | 9/1981 | Buseth et al. |
| 4,303,098 | 12/1981 | Shindelar |
| 4,476,892 | 10/1984 | Boyce |
| 4,582,295 | 4/1986 | Kugler et al. |
| 4,583,711 | 4/1986 | Johnson |
| 4,805,417 | 2/1989 | Weaver et al. |
| 4,829,117 | 5/1989 | Schloman, Jr. et al. |
| 4,892,117 | 1/1990 | Spalink et al. |
| 5,076,324 | 12/1991 | Herman et al. |
| 5,139,049 | 8/1992 | Jensen et al. |
| 5,244,010 | 9/1993 | Barjasteh et al. |
| 5,293,902 | 3/1994 | Lapierie |
| 5,370,359 | 12/1994 | Sadegh et al. |
| 5,415,200 | 5/1995 | Haunhorst et al. ......... 137/614.05 |
| 5,450,875 | 9/1995 | Chichester et al. ......... 137/614.05 |

Primary Examiner—Kevin Lee
Attorney, Agent, or Firm—Geoffrey A. Mantooth

[57] ABSTRACT

A coupling contains a valve that can be opened or closed to allow refrigerant to pass therethrough. The coupling can be installed onto an air conditioning charging port by sliding a quick disconnect sleeve to a release position along a first end of a valve body. Inside of the valve body is a valve stem that moves between open and closed positions. The valve stem is moved by an actuator sleeve located on a second end of the valve body. The actuator sleeve has a circumferential slot therein. The valve stem cannot be inadvertently opened by fluid pressure because the translational movement of the actuator sleeve and the valve stem is limited by a hose fitting extending through the slot and engaging stop surfaces therein. When the quick disconnect sleeve is in the release position, the actuator sleeve is unable to move the valve stem from the closed position to the open position. When the valve stem is in the open position, the quick disconnect sleeve is prevented from moving to a release position by the actuator sleeve. Thus, the coupling valve cannot be removed from or installed onto a charging port while the valve stem is open.

6 Claims, 2 Drawing Sheets 5,603,353

QUICK DISCONNECT COUPLING

FIELD OF THE INVENTION

The present invention relates to couplings that can be quickly connected to and disconnected from a fitting, such as an air conditioning charging port, which couplings contain valves.

BACKGROUND OF THE INVENTION

Automotive air conditioning systems have charging ports that allow access to the refrigerant in the system. The charging ports are used to pass refrigerant into and out of the air conditioning systems. The charging ports are also used to attach pressure gauges to the systems.

A coupling is a device that fits onto a charging port. The coupling is connected to one end of a hose. The other of the hose is connected to a tank of refrigerant, a pressure gauge, or a manifold.

The coupling contains a valve that can be opened and closed. The coupling valve is opened in order to allow refrigerant to pass therethrough and into the air conditioning system by way of the charging port.

The air conditioning system coupling port has a interior valve. A typical type of valve found in a charging port is a Schroeder valve. The coupling port also has an exterior circumferential groove. This groove permits the use of a quick connect/disconnect mechanism.

When the coupling is installed onto the charging port, it is desirable to minimize refrigerant leakage due to cost and environmental concerns. Refrigerant leakage is minimize by installing the coupling onto the charging port with both the coupling valve in a closed position and the charging port valve in a closed position.

Some prior art valves open the charging port valve at the same time that the coupling is installed onto the charging port. For example, U.S. Pat. No. 5,293,902 shows valves in the coupling and in the charging port that automatically open as the coupling is installed onto the charging port. Because the charging port valve opens before the seals around the port are established, refrigerant leaks out. In addition, by opening the charging port valve during the installation of the coupling onto the port, the installation is made harder. This is because the operator who is pushing the coupling onto the charging port must overcome the pressure of the leaking refrigerant.

U.S. Pat. Nos. 2,473,223 and Re 34,781 show a coupling that can be installed onto a charging port with the coupling valve closed. Once the coupling is installed onto the port, a handle is rotated to open the coupling valve. The handle must be rotated numerous times in order to open and close the coupling valve. Consequently, when the coupling is removed from the charging port, the coupling valve may not be entirely closed, resulting in leakage through the valve. Furthermore, the coupling is relatively long compared to other couplings. The engine compartments of some automobiles are crowded, and lack the physical space to utilize a long coupling.

In addition, prior art couplings, such as shown in U.S. Pat. No. 3,731,705 require many parts and are therefore complicated and expensive.

SUMMARY OF THE INVENTION

It is an object of the present invention to provide a coupling with a valve therein, which coupling can only be coupled to a charging port with the coupling valve closed, in order to minimize refrigerant leakage.

It is another object of the present invention to provide a coupling that couples to a charging port in such a way that a valve inside of the charging port cannot be opened during the installation of the coupling onto the charging port in order to minimize refrigerant leakage and in order to ease installation of the coupling onto the charging port.

It is another object of the present invention to provide a coupling with a valve inside, which coupling cannot be removed from the charging port if the charging valve is opened.

It is another object of the present invention to provide a coupling that is short in length so that the coupling can be more easily used in automobile engine compartments.

It is another object of the present invention to provide a coupling that has relatively few parts.

It is another object of the present invention to provide a coupling with a valve therein, which coupling can be disassembled for repair.

The coupling of the present invention is for attachment to a charging port. The coupling includes a valve body, a conduit that is coupled to the valve body, a valve stem, an actuator sleeve, and a quick disconnect sleeve. The valve body has first and second ends and has a cavity located at the first end. The cavity has a seal and is structured and arranged for receiving the charging port. The first end of the valve body has means for quickly connecting and disconnecting the coupling onto the charging port. The means for quickly connecting and disconnecting includes the quick disconnect sleeve which is located around the first end of the valve body. The quick disconnect sleeve slides on the valve body between a secure position and a release position. When the quick disconnect sleeve is in the secure position, portions of valve detent balls are forced into the valve body cavity. When the quick disconnect sleeve is in the release position, the valve detent balls can exit the valve body cavity. The valve body has a bore therein that communicates with the cavity. The valve body has a fluid port therein that communicates with the bore. The conduit extends radially from the valve body and is in communication with the fluid port.

The valve stem is located in the bore and is movable along a longitudinal axis of the bore. The valve stem has a first end that is located in the cavity and a second end that exits the valve body second end. The actuator sleeve is located around the second end of the valve body and is coupled to the second end of the valve stem. The actuator sleeve is slidable along the valve body from the valve body second end where the actuator sleeve is in a closed position, toward the first end, where the actuator sleeve is an open position. When the actuator sleeve is in the closed position, the valve stem prevents communication between the fluid port and the cavity through the bore. When the actuator sleeve moves to the open position, the valve stem moves toward the cavity and allows communication between the fluid port and the cavity through the bore.

The actuator sleeve has a slot therethrough. The slot receives a portion of the conduit and has stop surfaces that prevent nonrotational movement of the actuator sleeve between the open and closed positions. The slot has a circumferential channel between the stop surfaces that allows the actuator sleeve to be rotated about the valve body and moved between the open and closed positions.

The quick disconnect sleeve has a first stop which contacts the actuator sleeve when the quick disconnect sleeve in the release position and the actuator sleeve is moved from the closed position toward the open position. The first stop thereby prevents the movement of the actuator sleeve to the open position. The actuator sleeve has a second stop, which second stop contacts the quick disconnect sleeve when the actuator sleeve is in the open position and the quick disconnect sleeve is moved from the secure position toward the release position. The second stop thereby prevents movement of the quick disconnect sleeve to its release position.

The coupling of the present invention provides a foolproof mechanism for maintaining the valves in the coupling and in the charging port in closed positions until the coupling is installed onto the charging port. This is accomplished by having the quick disconnect sleeve interact with the actuator sleeve. When the coupling is to be installed onto the charging port, the quick disconnect sleeve is pulled back toward the actuator sleeve. This prevents the actuator sleeve from moving forward toward the coupling port. As a result, the valve in the coupling stays closed as does the valve in the charging port.

Once the coupling is installed onto the charging port, the quick disconnect sleeve returns to its original position, toward the coupling port end of the valve body. This unblocks the actuator sleeve, wherein the actuator sleeve can now be moved toward the charging port. Such movement by the actuator sleeve opens both valves in the coupling and in the charging port. With the actuator sleeve in its open position, the quick disconnect sleeve cannot be pulled back to remove the coupling from the charging port. As a result, the coupling cannot be removed from the charging port while the respective valves are open. The valve must be closed by moving the actuator sleeve away from the charging port in order to remove the coupling from the charging port.

In addition, the valve body has a hose fitting. The hose fitting extends through a slot in the actuator sleeve. The slot is configured with stop surfaces. Thus, the actuator sleeve cannot be slid nonrotationally between its open and closed position. Instead, the actuator sleeve must be rotated and then moved translationally in order to open and close the valves. This arrangement simplifies the construction of the coupling, enabling the coupling to have a small number of parts. In addition, the coupling is compact and rugged. The coupling is also easy to disassemble and repair (such as to replace o-rings).

DESCRIPTION OF THE PREFERRED EMBODIMENT

Figure 1:
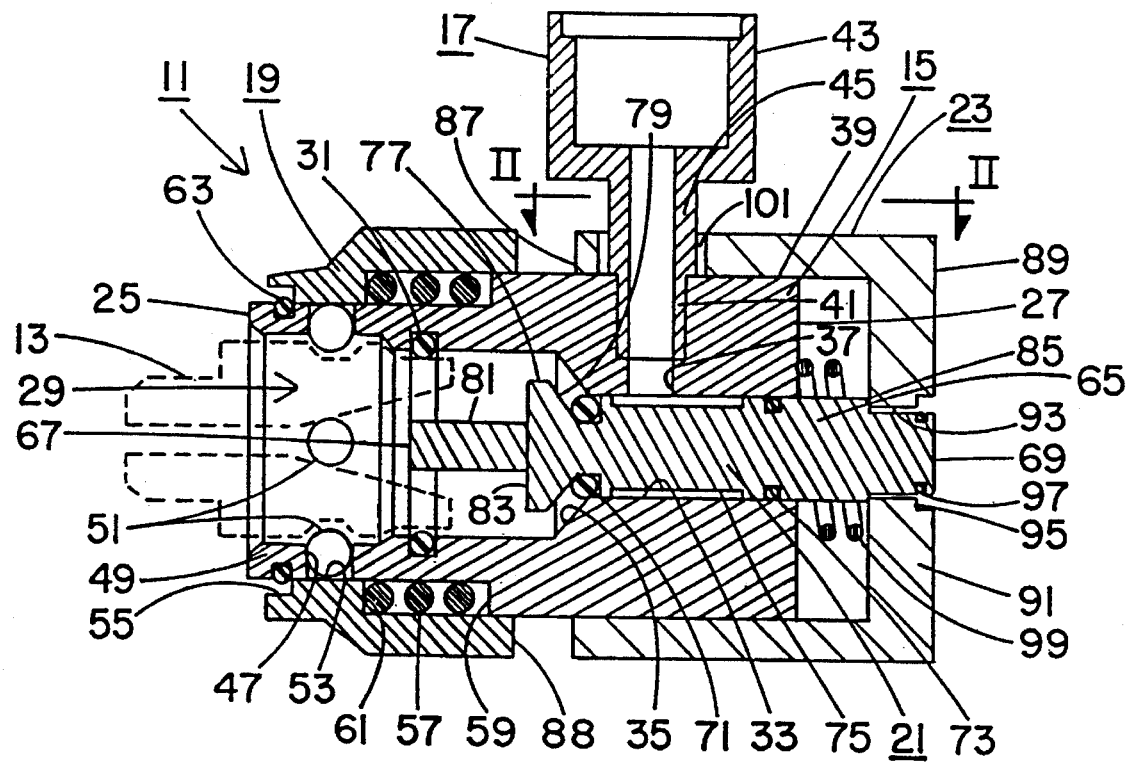
FIG. 1 is a longitudinal cross-sectional view of the coupling of the present invention, in accordance with a preferred embodiment, shown with the valve in the closed position. A charging port is shown in dashed lines inside of the coupling.

In FIG. 1, there is shown a cross-sectional view of the coupling 11 of the present invention, in accordance with a preferred embodiment. The coupling 11 contains a valve, which valve can be opened or closed to regulate the flow of fluid through the coupling.

The coupling 11 is used to connect to a charging port 13. The charging port 13 is connected to an air conditioning system (not shown). When the valve in the coupling 11 is opened as shown in FIG. 4, a valve inside of the charging port is also opened.

The coupling 11 has a quick disconnect (or quick connect) feature. The quick disconnect feature includes a quick disconnect sleeve 19 that slides back and forth. The coupling 11 utilizes the sliding action of the quick disconnect sleeve 19 to prevent the opening of the coupling valve while the coupling is being installed onto the charging port (see FIG. 3). Thus, refrigerant is prevented from leaking out of the coupling during installation onto the charging port. In addition, the valve 111 in the charging port cannot be opened until the coupling is fully installed onto the charging port, wherein the seal around the charging port is made and refrigerant leakage from the charging port valve is prevented.

Figure 4:
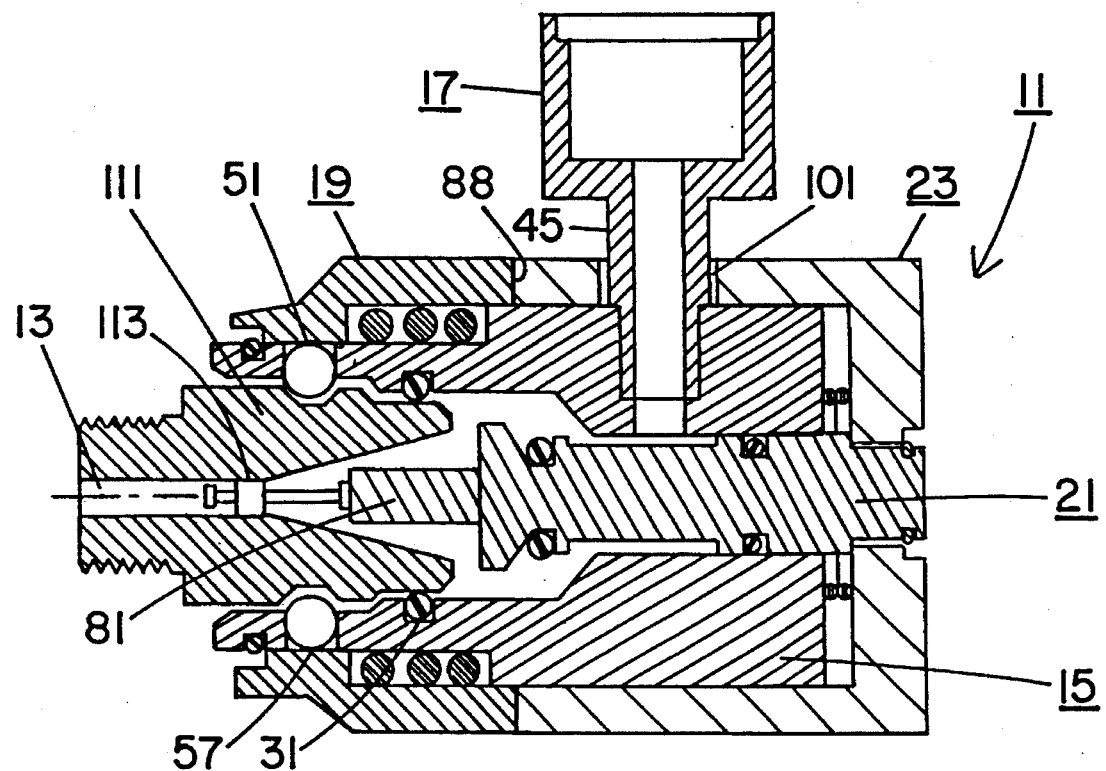
FIG. 4 is cross-sectional view of the coupling of FIG. 3 installed onto the charging port, shown with both coupling valve being opened and the charging port valve being opened.

Once the coupling 11 is installed onto the charging port 13, as shown in FIG. 4, the valve 21 in the coupling can be opened. This action also opens the valve 113 in the charging port 13, thereby allowing refrigerant to flow through the charging port and the coupling. When the coupling valve is opened, the quick disconnect sleeve 19 cannot slide, thereby preventing removal of the coupling from the charging port. Thus, when the valves are opened, refrigerant does not leak due to premature removal of the coupling.

The specifics of the coupling 11 will now be described. Referring to FIG. 1, the coupling has a valve body 15, a hose fitting 17, a quick disconnect sleeve 19, a valve stem 21, and an actuator sleeve 23.

The valve body 15 is generally cylindrical and has first and second ends 25, 27. The first end 25 of the valve body has a cavity 29 that receives the charging port 13. The cavity 29 has a circumferential groove therein that receives an o-ring 31. This o-ring 31 forms a seal around the charging port 13 when the charging port is inserted into the cavity 29 as shown in FIG. 4. A bore 33 extends along the longitudinal axis of the valve body 15 from the cavity 29 to the second end 27 of the valve body. The bore 33 is of a smaller diameter than is the cavity 29. A chamfered stop surface 35 merges the cavity 29 with bore 33. A fluid port 37 extends transversely from the bore 33 to an outside surface 39 of the valve body. The fluid port 37 is threaded along at least part of its length.

The hose fitting 17 forms an adaptor that couples a larger diameter hose (not shown) to the smaller diameter fluid port 37. The hose fitting 17 has a valve body end 41 and a hose end 43. A portion of the valve body end 41 has male threads and screws into the fluid port 37. The hose end 43 has female threads and receives a threaded end of the conventional and commercially available hose. When the hose fitting 17 is threaded into the valve body 15, a shank 45 extends outwardly from the valve body 15.

The quick disconnect sleeve 19 is located around the first end 25 of the valve body 15. The quick disconnect sleeve 19 is slidable along the valve body. The sliding motion of the quick disconnect sleeve covers or uncovers openings 47 in the valve body. The openings 47 are formed in a wall of the valve body and extend radially outwardly from the cavity 29. The openings are spaced around the circumference of the valve body (in the preferred embodiment, there are four openings 47 spaced 90 degrees apart). Each opening 47 receives a ball bearing 51. Each opening is slightly smaller in diameter at its cavity end than at its exterior end, in order to prevent the ball bearing 51 from falling out of the opening and completely entering the cavity 29.

Figure 3:
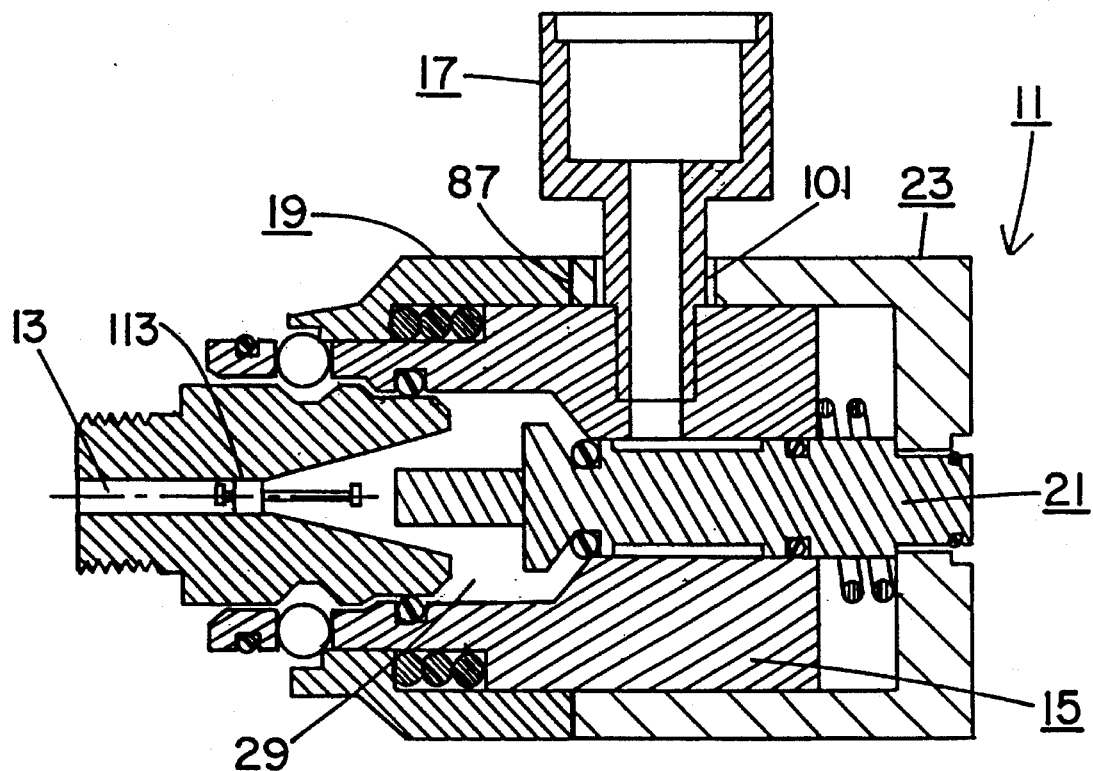
FIG. 3 is a cross-sectional view of the coupling of FIG. 1, shown with the quick disconnect sleeve pulled back into the release position as the coupling is being inserted onto a charging port, and with the coupling valve closed.

The quick disconnect sleeve 19 can move along the valve body between a secure position (shown in FIGS. 1 and 4) and a release position (shown in FIG. 3). By so moving, the quick disconnect sleeve 19 locates either a first bore 53 or a second bore 55 adjacent to the ball bearings 51. In the secure position, the first bore 53, which has an inside diameter that is slightly larger than the outside diameter of the first end 25 of the valve body, covers the openings 47. This forces a portion of each ball bearing 51 into the cavity 29. In the release position of FIG. 3, the second bore 55, which has an inside diameter that is larger than the inside diameter of the first bore 53, is radially aligned with the openings 47. This effectively uncovers the openings 47 and the ball bearings 51 can completely exit the valve body cavity 29. However, the second bore 55 prevents the ball bearings from escaping the openings 47.

A helical spring 57 around the valve body 15 biases the quick disconnect sleeve 19 into the secure position. The spring 57 extends between a valve body shoulder 59 and a shoulder 61 on the quick disconnect sleeve 19. The range of motion of the quick disconnect sleeve 19 on the valve body 15 is limited by various stops. The quick disconnect sleeve 19 is prevented from moving beyond the secure position and past the first end 25 of the valve body 15 by a wire clip 63 that is contained in a circumferential groove near the first end 25. The sleeve 19 is prevented from moving beyond the release position by the compressed spring 57. Another stop is the actuator sleeve 23, which will be described in more detail below.

The valve stem 21 is generally cylindrical and is located inside of the valve body bore 33. The valve stem 21 has a middle portion 65 and first and second ends 67, 69. The middle portion 65 of the valve stem has two o-rings 71, 73 that are spaced apart from each other and that are received by circumferential grooves in the stem. When the valve stem 21 is inserted into the bore 33, one o-ring 71 is located near the cavity 29, while the other o-ring 73 is located near the second end 27 of the valve body 15. Thus, a seal is formed in the bore 33 around the location containing the fluid port 37. The portion 75 of the valve stem 21 that is located between the two o-rings 71, 73 has a reduced diameter in order to allow better fluid flow through the valve body bore 33. Adjacent to the o-ring 71 that is located near the cavity is an enlarged stop 77. The diameter of the stop 77 is larger than the diameter of the bore 33. The stop 77 is located in the cavity 29 and has a chamfered surface 79 that mates the chamfered stop surface 35 between the cavity and the bore. A pin 81 makes up the first end 67 of the valve stem 21. The pin 81 extends from the stop 77 toward the valve body first end 25. The pin is centered along the longitudinal axis of the cavity 29. The face 83 of the stop 77 from which the pin extends can be notched or grooved to allow better fluid flow around the stop.

The second end 69 of the valve stem 21 extends out of the valve body bore 33 for some distance. A stop shoulder 85 is formed, with the second end 69 of the valve stem 21 having a reduced diameter.

The valve stem 21 moves inside of the valve body 15 between open and closed positions. In the closed position, shown in FIG. 1, the bore 33 and the fluid port 37 are sealed by the two o-rings 71, 73. In the open position, shown in FIG. 4, the valve stem 21 has moved toward the first end 25 of the valve body 15. This moves the first end o-ring 71 into the cavity 29 and allows fluid to flow from the cavity into the bore 33 and thence into the fluid port 37.

The valve stem 21 is moved between the open and closed positions by way of the actuator sleeve 23. The actuator sleeve 23 has an inside diameter that is slightly larger than the outside diameter of the second end 27 of the valve body. The actuator sleeve 23 can slide along the valve body 15. The actuator sleeve 23 has first and second ends 87, 89. The second end 89 of the actuator sleeve, which is adjacent to the second end 27 of the valve body 15, is closed by way of an end wall 91. The end wall 91 is coupled to the second end 69 of the valve stem 21. More specifically, the end wall 91 has an opening 93 therein, which opening is centered on the longitudinal axis of the coupling. The opening 93 has a diameter that is smaller than the diameter of the valve stem stop shoulder 85. A counterbore 95 is formed on the outside portion of the opening 93. The second end 69 of the valve stem 21 has a circumferential groove for receiving a snap ring 97. The counterbore 95 allows access to the snap ring 97. Thus, the end wall 91 of the actuator sleeve 23 is captured between the stop shoulder 85 and the snap ring 97 of the valve stem 21. The actuator sleeve 23 and valve stem 21 move translationally in unison. However, the actuator sleeve can rotate independently of the valve stem. A helical spring 99 is provided around the valve stem 21 between the valve body 15 and the actuator sleeve end wall 91. The spring 99 assists an operator moving the actuator sleeve and the valve stem into the closed position from the open position.

The actuator sleeve 23 can also move rotationally about the valve body 15. The present invention utilizes such rotational movement to limit the translational movement of the actuator sleeve 23 and the valve stem 21. The actuator sleeve 23 is provided with a slot 101 therethrough. The slot 101 allows the shank 45 of the hose fitting 17 to extend through the actuator sleeve. Thus, the actuator sleeve 23 moves between open and closed positions to open and close the valve stem 21.

Figure 2:
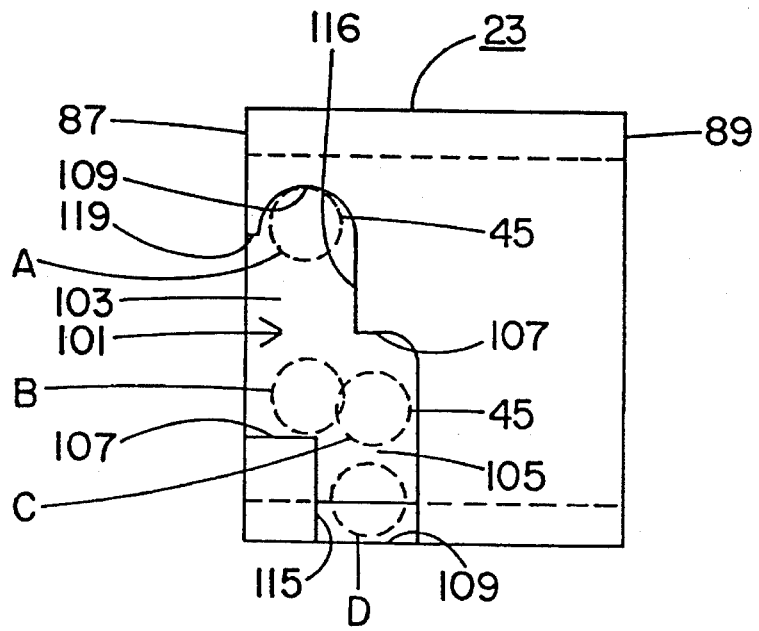
FIG. 2 is a view of the actuator sleeve taken along lines II—II of FIG. 1.

The slot 101 is shaped so as to control the rotational and translational movement of the actuator sleeve 23. FIG. 2 shows a plan view of the actuator sleeve 23 and its slot 101. The slot 101 has two partial circumferential channels 103, 105 that are offset from each other both circumferentially and axially. There is a closed position channel 103 and an open position channel 105. Both the closed position channel and the open position channel extend circumferentially around portions of the actuator sleeve. The closed position channel 103 is located nearer to the first end 87 of the actuator sleeve than is the open position channel 105. In addition, the open position channel is offset circumferentially from the closed position channel. The channels have a width (which width is parallel to the longitudinal axis) that is slightly larger than the outside diameter of the hose fitting shank 45. Each channel 103, 105 has a common end 107 and a locking end 109. The two channels are connected at their common ends 107, with the channels extending, in the preferred embodiment, from their common ends in opposite directions with respect to each other.

The two channels form a path for the hose fitting shank 45. When the actuator sleeve 23 is in the closed position, the shank 45 is located at position A (shown in dashed lines in FIG. 2) in the locking end 109 of the closed position channel 103. To move the actuator sleeve to the open position, the actuator sleeve is rotated until the shank 45 contacts the common end 107 of the channel 103. The shank is now in position B. Then, the actuator sleeve 23 is pushed toward the quick disconnect sleeve 19, in order to move the shank into the common end 107 of the open position channel 105 (to position C). Then, the actuator sleeve is rotated further so as to locate the shank 45 at the locking end of the open position channel 105 (position D). In the preferred embodiment, the channels 103, 105 are 60–90 degrees in circumferential length.

The operation of the coupling 11 will now be described. In its unused configuration, the coupling 11 is as shown in FIG. 1. The quick disconnect sleeve 19 is in the secure position, and the actuator sleeve 23 and valve stem 21 are in the closed position. Thus, any refrigerant contained in the hose that is coupled to the hose fitting 17 cannot escape by way of the coupling.

Referring to FIG. 3, the coupling is installed onto the charging port 13 by an operator pulling the quick disconnect sleeve 19 back to the first end 87 of the actuator sleeve 23. The quick disconnect sleeve 19 is now in the release position, wherein the coupling can be installed onto the charging port 13 by inserting the charging port into the cavity 29.

When the coupling 11 is installed onto the charging port, the valve stem 21 remains in the closed position. In fact, any attempt to open the valve stem 21 while the coupling is being installed onto the charging port 13 is prevented. This is because the valve stem 21 can only be opened by moving the actuator sleeve 23 toward the charging port 13. But such movement by the actuator sleeve 23 is prohibited by the end 88 of quick disconnect sleeve 19 being in its release position.

Once the coupling 11 has been installed onto the charging port 13, the quick disconnect sleeve 19 is released by the operator and the spring 57 pushes the quick disconnect sleeve to the secure position. The ball bearings 51 are forced into a channel 111 around the charging port 13, thus securing the coupling to the charging port. In addition, the o-ring 31 forms a seal around the charging port 13. In this configuration, the coupling 11 is once again as shown in FIG. 1 (in FIG. 1 the charging port is shown in dashed lines).

Because the quick disconnect sleeve 19 no longer prohibits sliding movement of the actuator sleeve 23, the valve stem 21 can be opened. This is accomplished by rotating the actuator sleeve 23 so as to move the slot 101 past the hose fitting shank 45, wherein the shank changes position from the locking end of the closed position channel 103 (position A of FIG. 2) to the common end (position B) and then pushing the actuator sleeve 23 toward the quick disconnect sleeve 19 so as to move the shank into the open position channel (position C). The actuator sleeve is then locked in the open position by rotating the sleeve 23 so as to locate the shank in position D.

With the actuator sleeve 23 in the open position, the coupling is as shown in FIG. 4. The movement of the valve stem pin 81 pushes the Schroeder valve 113 in the port open. Fluid can now be exchanged through the coupling 11.

Note that with the valve stem 21 in the open position, the coupling 11 cannot be removed from the charging port 13. This is because to remove the coupling, the quick disconnect sleeve 19 must be moved back toward the shank 45. But, the actuator sleeve 23 prevents such movement by the quick disconnect sleeve by way of the end 87. The actuator sleeve 23 is prevented from moving translationally by the hose fitting shank 45. Specifically, the slot 101 has a stop surface 115 that contacts the shank 45, thereby preventing the actuator sleeve 23 from being pulled back away from the quick disconnect sleeve.

Furthermore, the valve stem 21 is prevented from being inadvertently closed or opened by pressure acting on the valve stem. This is because translational movement of the valve stem is prohibited by the shank 45 being either in position A or position D relative to the actuator sleeve slot. In these two positions A and D, the shank 45 contacts stop surfaces 115, 116. One stop surface 115 prevents the actuator sleeve from being moved away from the quick disconnect sleeve, while the other stop surface 116 prevents the actuator sleeve from being moved toward the quick disconnect sleeve. An operator must rotate the actuator sleeve to move the valve stem.

Thus, the coupling provides a foolproof mechanism for installation onto and removal from a charging port, wherein the coupling valve must be closed. If the coupling valve is opened, then the coupling cannot be installed onto or removed from the charging port.

In addition, the stop 77 (FIG. 1) on the valve stem 21 contacts the stop surface 35 in the valve body if the valve stem is moved too far toward the valve body second end 27. The stop 77 thus prevents the o-ring 73 from breaking its seal inside the bore 33.

The outside surface 117 of the actuator sleeve 23 is knurled to provide for better gripping. The actuator sleeve 23 thus functions as a handle to open and close the coupling valve. Because a portion of the handle is contained around the outside of the valve body 15, and not all at the second end 27 of the valve body, the overall length of the coupling is shorter than prior art couplings.

The coupling 11 is designed so as to be easily assembled and disassembled. The assembly will now be described. First, the hose fitting 17 is screwed into the fluid port 37 of the valve body 15. Then, the o-rings 71, 73, 31 are installed onto the valve stem 21 and in the valve body cavity 29. The quick disconnect sleeve 19 can be assembled next. The spring 57 is located on the valve body 15 and the ball bearings 51 are located in their openings 47. The quick disconnect sleeve 19 is slid onto the first end 25 of the valve body and secured in place with the wire clip 63. The valve stem 21 is then inserted into the cavity 29 and the bore 33 so that its second end 69 protrudes from the second end 27 of the valve body. The spring 99 is located around the valve stem. The actuator sleeve 23 is pushed onto the valve body second end 27 so that the valve stem second end 69 protrudes out of the opening 93. A snap ring 97 then secures the actuator sleeve 23 to the valve stem 21. The assembly of the coupling 11 is complete.

The actuator sleeve 23 is provided with an opening 119 between the first end 87 and the closed position channel 103. The opening 119 extends from the common end 107 toward the locking end 109 of the closed position channel 103. This opening 119 allows the actuator sleeve to be installed onto the valve body after the hose fitting 17 has been installed into the valve body. To prevent leakage, the hose fitting is substantially tightened into the valve body. Once installed at the factory, it need not be removed. Alternatively, the hose fitting 17 could be provided with a seal (such as a o-ring). The hose fitting could be installed into the valve body after the actuator sleeve is been installed, wherein there is no need for the opening 119.

Unlike many prior art couplings, the coupling 11 of the present invention can be repaired. Repair typically involves replacement of o-rings, which tend to leak with use and over time. The coupling 11 is disassembled in the opposite manner as described above with respect to assembly and the o-rings and other parts can be replaced.

The valve stem 21 can be coupled to the actuator sleeve 23 in ways other than what is shown. For example, the valve stem second end 69 can be equipped with threads, which can be received by threaded opening 93.

The foregoing disclosure and the showings made in the drawings are merely illustrative of the principles of the invention and are not be interpreted in a limiting sense.

We claim:

1. A quick disconnect coupling for attachment to a charging port, comprising:

a) a valve body having first and second ends, the valve body having a cavity located at the first end, the cavity having a seal, the cavity being structured and arranged for receiving the charging port therein;

b) the first end of the valve body having means for quickly connecting and disconnecting the coupling onto the charging port, the means for quickly connecting and disconnecting having a quick disconnect sleeve located around the first end of the valve body, the quick disconnect sleeve sliding on the valve body between a secure position and a release position, wherein when the quick disconnect sleeve is in the secure position, portions of valve detent balls are forced into the valve body cavity, and when the quick disconnect sleeve is in the release position, the valve detent balls can exit the valve body cavity;

c) the valve body having a bore therein that communicates with the cavity;

d) the valve body having a fluid port therein that communicates with the bore;

e) a conduit coupled to the valve body and extending radially therefrom, the conduit being in communication with the fluid port;

f) a valve stem located in the bore, the valve stem being moveable along a longitudinal axis of the bore, the valve stem having a first end that is located in the cavity and a second end that exits the valve body second end;

g) an actuator sleeve located around the second end of the valve body and being coupled to the second end of the valve stem, the actuator sleeve being slidable along the valve body from the valve body second end, where the actuator sleeve is in a closed position, toward the first end, where the actuator sleeve is an open position, wherein when the actuator sleeve is in the closed position, the valve stem prevents communication between the fluid port and the cavity through the bore, and when the actuator sleeve moves to the open position, the valve stem moves toward the cavity and allows communication between the fluid port and the cavity through the bore;

h) the actuator sleeve having a slot therethrough, the slot receiving a portion of the conduit, the slot having stop surfaces that prevent nonrotational movement of the actuator sleeve between the open and closed positions, the slot extending between the stop surfaces so as to allow the actuator sleeve to be rotated about the valve body and moved between the open and closed positions;

i) a first stop located on the quick disconnect sleeve, which first stop contacts the actuator sleeve when the quick disconnect sleeve is in the release position and the actuator sleeve is moved from the closed position toward the open position, thereby preventing the movement of the actuator sleeve to the open position;

j) a second stop located on the actuator sleeve, which second stop contacts the quick disconnect sleeve when the actuator sleeve is in the open position and the quick disconnect sleeve is moved from the secure position toward the release position, thereby preventing the movement of the quick disconnect sleeve to its release position.

2. The coupling of claim 1 wherein the bore is of a smaller diameter than a diameter of the cavity.

3. The coupling of claim 1 wherein the conduit is a hose fitting.

4. The coupling of claim 1 wherein the actuator sleeve has first and second ends, with the second end of the actuator sleeve being adjacent to the second end of the valve body, the second end of the actuator sleeve having an end wall that couples to the valve stem.

5. The coupling of claim 1 wherein the means for quickly connecting and disconnecting comprises a spring that biases the quick disconnect sleeve in the secure position, the spring being located around the valve body and extending between the quick disconnect sleeve and a shoulder on the valve body.

6. The coupling of claim 1 wherein the valve stem is a one piece valve stem.

* * * * *